(No Model.)
J. F. SWEENEY.
PERCH FOR BIRD CAGES.
No. 447,006. Patented Feb. 24, 1891.
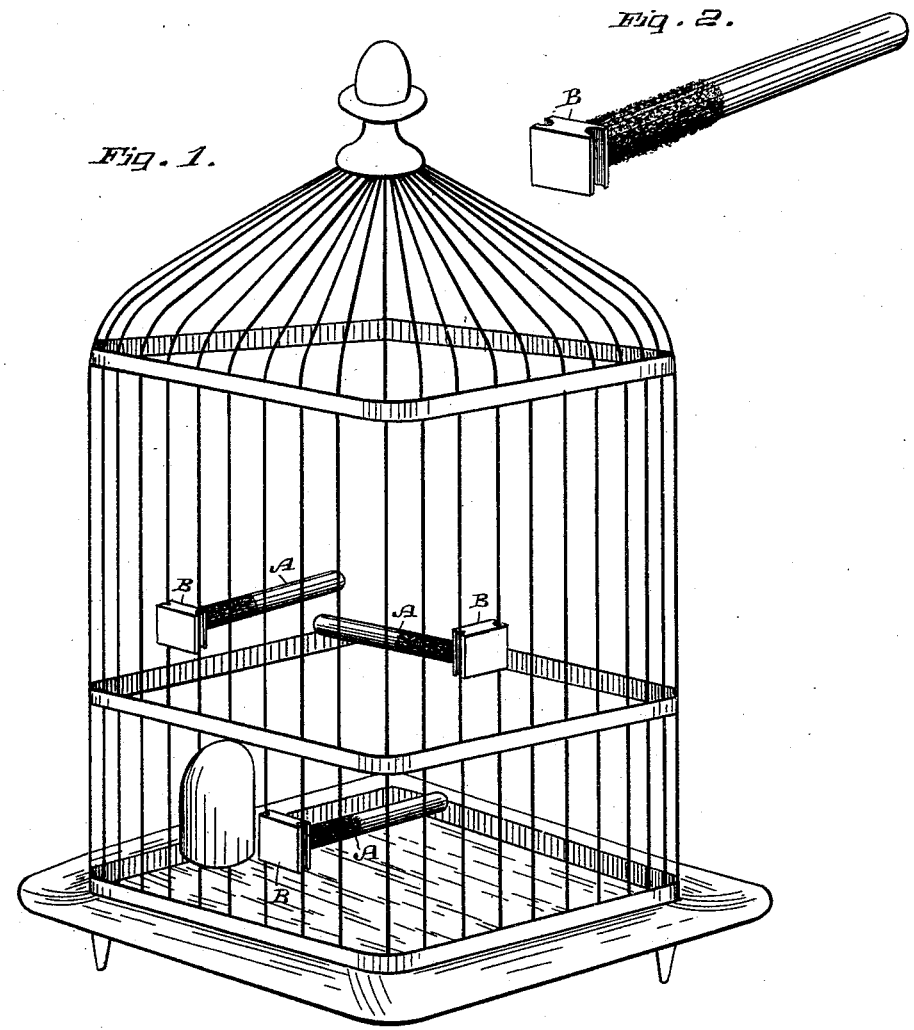
Witnesses
Geo. H. Strong
Inventor,
John F. Sweeney

UNITED STATES PATENT OFFICE.

JOHN F. SWEENEY, OF SAN FRANCISCO, CALIFORNIA.

PERCH FOR BIRD-CAGES.

SPECIFICATION forming part of Letters Patent No. 447,006, dated February 24, 1891.

Application filed March 4, 1890. Serial No. 342,612. (No model.)

*To all whom it may concern:*

Be it known that I, JOHN F. SWEENEY, a citizen of the United States, residing in the city and county of San Francisco, State of California, have invented an Improvement in Perches for Bird-Cages; and I hereby declare the following to be a full, clear, and exact description of the same.

My invention relates to an improved perch for bird-cages; and it consists of the improved perch hereinafter fully described and claimed.

Referring to the accompanying drawings for a more complete explanation of my invention, Figure 1 is a view showing the arrangement of the perch within the cage. Fig. 2 is a perspective view of the perch detached.

A is the perch-bar, which may be made of any suitable or desirable length less than the distance across the cage. I prefer to make these perches not to exceed half the width of the cage, and upon one end of the perch is fixed a strip B, having vertical grooves made in its edges. This strip is of such width that the wires of the cage must be spread slightly to allow it to be introduced between them, and then the spring of the wires will cause them to press into the grooves or channels on the sides, and thus hold it firmly in place. The vertical length of this strip is sufficient to give it all the necessary firmness to support the perch which projects from it into the cage.

It will be manifest that the perch may be raised or lowered and held at any desirable point by the frictional pressure of the wires upon the holder B. By this construction the perches are easily supported within the cage and in proper positions with relation to each other, so that the bird can easily fly from one perch to the other without danger of breaking or damaging his feathers, and no perch need be placed over another one, so as to become soiled or dirty.

Upon that portion of the perch preferably nearest to the side of the cage I fix a compound of sharp sand and red pepper by means of fish-glue, with which it is affixed, this being harmless to the birds. A portion of the coating of the perch may be simply of sharp sand, and another portion may be made of sand and red pepper mixed. This gives the bird an opportunity to rub and scratch itself. The pepper acts to keep it clean from vermin, and the sharp sand will wear upon the ends of the toe-nails, so as to prevent them from becoming too long, which is a great difficulty where birds are confined in cages. By this construction the perches are always kept clean, they do not need washing, and the bird is not liable to catch cold or any ailment which will occur from being exposed to dampness of the perches.

Having thus described my invention, what I claim as new, and desire to secure by Letters Patent, is—

A perch for bird-cages, supported from the side or sides of the cage, a coating of fish-glue, and a compound of fine sharp sand and red pepper applied to and secured upon the perch by means of the glue, substantially as herein described.

In witness whereof I have hereunto set my hand.

JOHN F. SWEENEY.

Witnesses:
S. H. NOURSE,
H. C. LEE.